US012661729B2

(12) United States Patent
Kleinbach

(10) Patent No.: US 12,661,729 B2
(45) Date of Patent: Jun. 23, 2026

(54) METHOD FOR GEAR SHAPING A TOOTHING, CONTROL PROGRAM, AND GEAR SHAPING MACHINE FOR CARRYING OUT THE METHOD

(71) Applicant: GLEASON-PFAUTER MASCHINENFABRIK GMBH, Ludwigsburg (DE)

(72) Inventor: Kurt Kleinbach, Beilstein (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 434 days.

(21) Appl. No.: 18/551,210

(22) PCT Filed: Mar. 15, 2022

(86) PCT No.: PCT/EP2022/056704
§ 371 (c)(1),
(2) Date: Sep. 19, 2023

(87) PCT Pub. No.: WO2022/207309
PCT Pub. Date: Oct. 6, 2022

(65) Prior Publication Data
US 2024/0173784 A1 May 30, 2024

(30) Foreign Application Priority Data

Apr. 1, 2021 (DE) .......................... 102021001718.8

(51) Int. Cl.
*B23F 17/00* (2006.01)
*B23F 5/16* (2006.01)
(Continued)

(52) U.S. Cl.
CPC ................ *B23F 17/00* (2013.01); *B23F 5/16* (2013.01); *B23F 23/006* (2013.01);
(Continued)

(58) Field of Classification Search
CPC . Y10T 409/103975; Y10T 409/100159; Y10T 409/10795; Y10T 409/107155;
(Continued)

(56) References Cited

U.S. PATENT DOCUMENTS

| 1,297,332 | A | | 3/1919 | Derr | |
|---|---|---|---|---|---|
| 4,514,119 | A | * | 4/1985 | Izumo | B23F 21/10 409/60 |

(Continued)

FOREIGN PATENT DOCUMENTS

| DE | 102019004299 A1 | 12/2020 |
|---|---|---|
| EP | 0074659 A2 | 3/1983 |

(Continued)

OTHER PUBLICATIONS

International Search Report and Written Opinion for PCT/EP2022/056704, ISA/EPO, Jul. 15, 2022, 15 pgs.
Search Report from the German Patent and Trademark Office for DE 102021001718.8, Apr. 5, 2022, 6 pgs.
Thomas Bausch et al., "Innovative Zahnradfertigung [Innovative gear production]," 3rd edition, p. 281, image 7.1-1.
(Continued)

*Primary Examiner* — Erica E Cadugan
(74) *Attorney, Agent, or Firm* — Robert L. McDowell

(57) ABSTRACT

The invention relates to a method for gear shaping a toothing (55) with a specified normal pitch ($m_n$), angle of action ($\alpha$), and optionally a helix angle ($\beta$) on a workpiece (50), wherein a shaper cutter (40) moving in stroke cycles with a specified stroke length (h) removes material from the workpiece in multiple working strokes in a rolling machining engagement, thereby forming contact tracks, wherein the contact track on the partial circle in the stroke center runs at an angle ($\gamma$) to the flank line (57) at least for a first plurality of strokes, the cotangent of said angle being smaller than or equal to the product of a constant of 40, preferably 33, in particular 25, and a geometry/process factor.

12 Claims, 3 Drawing Sheets

Figure 1:
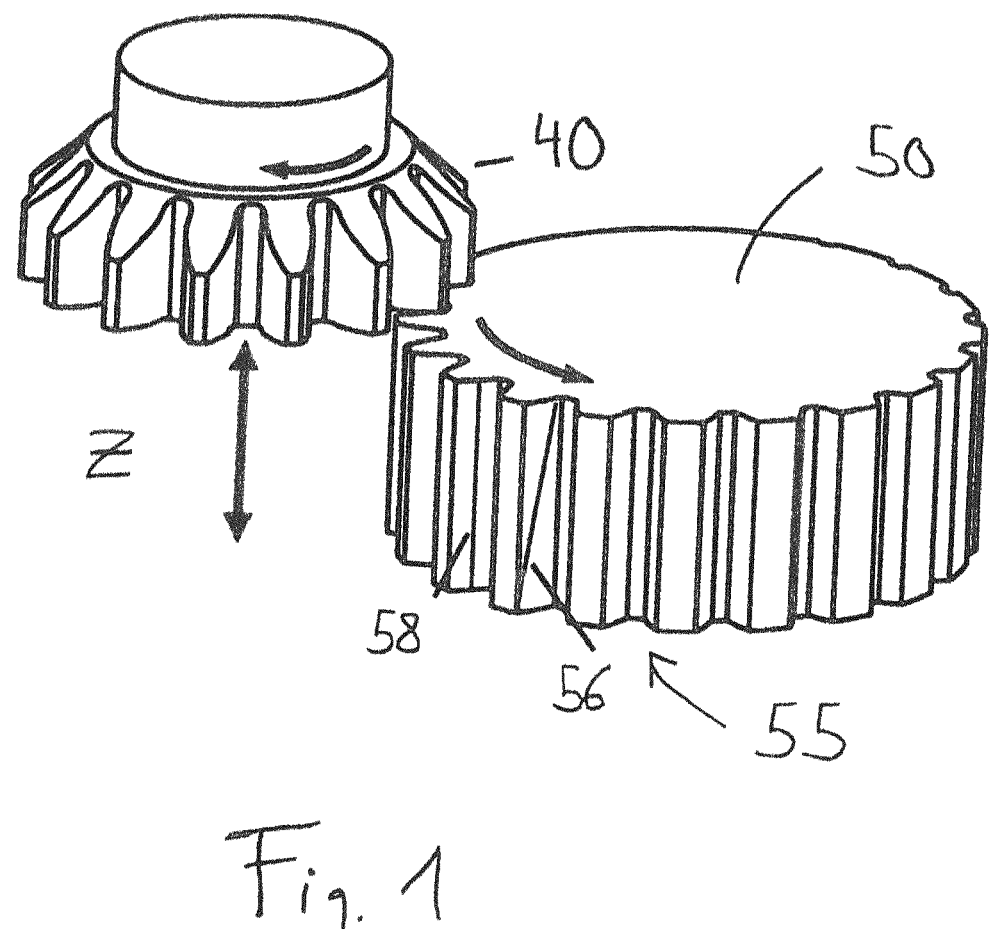

(51) Int. Cl.
_B23F 23/00_ (2006.01)
_G05B 19/18_ (2006.01)

(52) U.S. Cl.
CPC .. _G05B 19/186_ (2013.01); _G05B 2219/45214_ (2013.01); _Y10T 409/100159_ (2015.01); _Y10T 409/105247_ (2015.01); _Y10T 409/107155_ (2015.01); _Y10T 409/10795_ (2015.01)

(58) Field of Classification Search
CPC .. Y10T 409/105247; B23F 17/00; B23F 5/16; G05B 19/186; G05B 2219/36198; G05B 2219/45214
USPC ..................................... 409/26, 2, 51, 46, 34
See application file for complete search history.

(56) References Cited

U.S. PATENT DOCUMENTS

| | | | | |
|---|---|---|---|---|
| 5,018,913 | A | * | 5/1991 | Seiberlich ........... B23F 23/1287 |
| | | | | 409/60 |
| 6,065,910 | A | * | 5/2000 | Egawa ...................... B23F 5/16 |
| | | | | 409/12 |
| 2022/0219253 | A1 | * | 7/2022 | Kleinbach ................ B23F 1/04 |

FOREIGN PATENT DOCUMENTS

| | | | |
|---|---|---|---|
| EP | 2368660 | A1 | 9/2011 |
| WO | 2006/133864 | A1 | 12/2006 |

* cited by examiner

40

50

Z

58

56

55

METHOD FOR GEAR SHAPING A TOOTHING, CONTROL PROGRAM, AND GEAR SHAPING MACHINE FOR CARRYING OUT THE METHOD

The invention relates to a method for gear shaping a toothing on a workpiece, wherein a shaper cutter moving in stroke cycles with a specified stroke length removes material from the workpiece in multiple working strokes in a rolling machining engagement, thereby forming contact tracks.

Such gear shaping is a technology for producing toothings which, on the one hand, has been known for a long time. It is a cutting method in which the main cutting movement is realized by a stroke movement of the tool, wherein material removal of the workpiece material takes place in the so-called working stroke, wherein the return stroke takes place in the lifted state to avoid return stroke streaks. This method principle is described, for example, in Thomas Bausch et al., "Innovative Zahnradfertigung [Innovative gear production]," 3rd edition, p. 281 in image 7.1-1.

An important advantage that gear shaping has over other methods such as gear hobbing is that it can be used universally, especially for workpieces with internal toothings or workpieces with shoulders connected to the toothing, for which gear hobbing is little or not at all suitable.

In addition to conventional feeding, degressive spiral feeds are now also used. Irrespective of the feed strategy, however, it can be observed that higher tool loads occur especially with high stroke numbers and in particular in toothings with a small helix angle up to straight toothings and with the prevailing high cutting forces the risk of damage is also increased.

In view of this observation, the invention is based on the object of further developing a gear shaping method of the type mentioned at the beginning with regard to a combination of satisfactorily rapid machining and process safety, and with as little tool wear as possible.

In terms of method, this object is achieved by the invention by a development of the method of the type mentioned at the beginning, which is essentially characterized in that the contact track on the partial circle in the stroke center runs at an angle $\gamma$ to the flank line at least for a first plurality of strokes, the cotangent of said angle being smaller than or equal to the product of a constant $K_1$ and $K_2$, wherein $K_1$ is equal to 40, preferably 33, in particular 25, and $K_2$ is a geometry/process factor (second factor) of $K_2 = K_h \cdot K_m \cdot K_\alpha \cdot K_\beta$ where $K_h = h[mm]/20$, $K_m = 3/m_n[mm]$, $K_\alpha = \sin 20°/\sin \alpha$ and $K_\beta = \cos \beta$. Here, $m_n$ is the normal pitch, $\alpha$ the angle of action and $\beta$ the optional helix angle of the workpiece toothing ($\beta = 0$ in the case of straight toothing) and h the stroke length.

It has been found, for example, that the type of chip formation in conventionally known gear shaping results in chip compression and, in addition, individual points of the cutting edge of the shaper cutter are stressed in a concentrated manner, as a result of which wear of the shaper cutter is also increased, and that these effects are related to the orientation of the contact tracks.

According to the invention, it is now provided that, compared to the prior art, the contact tracks extend over a larger region in the vertical direction of the tooth of the shaped toothing, whereby the effects explained above are mitigated. These contact tracks run substantially parallel to one another and essentially uniformly across the tooth flanks; with the usual realization of the stroke movement via a crank drive. However, the speed profile is not constant over the stroke. In addition, it has been found that advantageous designs do not resort to a fixed angle independent of workpiece and process, but rather an advantageous adjustment is present when the angular condition according to the invention in addition also depends on the process and on the geometry of the workpiece, which is expressed by the second factor $K_2$. In conventional methods, however, the contact tracks on the workpiece tooth flanks run almost parallel to the flank line, and values for cotangent y of typically 70 or higher are obtained in constellations where $K_2 = 1$ even in the case of a degressive radial feed.

$K_1$ could be preferably even 20.5, but $K_1$ could also be only 19.7, even only 19.4.

In a further preferred embodiment, it is provided for the shaper cutter to be fed via the first plurality of strokes, in particular in a constant spiral feed, and for a feed parameter, defined by the quotient of radial feeding per workpiece revolution and by the lifting amount of the shaper cutter between working stroke and return stroke in the first plurality of strokes, to be less than 1.4. This is definitely a low value compared to the prior art; surface removal of the material moves towards a trend of a flatter, but wider material removal. Together with the contact track adjustment according to the invention with comparatively earlier reaching of the overall height extension of the tooth flank, a particularly tool-friendly chip formation and absorption of the process forces on the shaper cutter are obtained. In addition, in spite of the changed contact track position, collision-free return strokes can be carried out with high process reliability. In this regard, it is also provided that the feed parameter can be less than 1.3, preferably less than 1.2, in particular less than 1.1, or even be 1.0.

In a further preferred configuration, it is provided for the first plurality and the second plurality of strokes to take place over a feed region with a predominant share of the overall feed for completion of the shaped toothing, and for the cotangent $\gamma$ to be greater than $40 \cdot K_2$, in particular greater than $60 \cdot K_2$, over a subsequent further feed region. This promotes a smoother transition to the still higher values, explained below, towards the end of machining.

A further preferred configuration is thus provided in which during a last feeding to final feed depth of the shaped toothing the cotangent $\gamma$ is greater than $80 \cdot K_2$, in particular greater than $120 \cdot K_2$. This permits higher machining accuracy towards the end of the shaping process. In other words, shaping machining can be divided into several regions of approximately 2 or 3 different kinematics, with an increasing shift from high machining speeds towards high machining accuracies.

The greatest effect as a result of the embodiment according to the invention is produced for straight toothings or toothings with a not too high helix angle. The method is intended, in particular, for helix angles of the toothing of less than 14°, more preferably less than 12°, in particular less than 10°.

In addition, it is preferred for the toothing width to be at least 60%, preferably at least 70%, in particular at least 80% of the stroke length (or, conversely, for the stroke length to be adapted to the tooth width within these ratio limits). This enables a favorable overall configuration with regard to favorable utilization of the stroke lengths for machining, wherein for achieving a satisfactory cutting speed, it is preferably provided for this ratio to be not more than 96%, in particular not more than 92%.

In a further preferred configuration, it is provided for the rolling positions to differ in a shaped gap between two successive workpiece rotations in each case. This ensures that not every tooth gap is machined again and again in exactly the same rolling position. For this purpose, the number of strokes per division should not be an exact whole number, wherein values of less than 1.4, more preferably less than 1.2, in particular less than 1.1, are preferred within the scope of the invention. However, in this respect values of less than 1, even less than 0.9, are conceivable, wherein, on the other hand, these values should preferably not lie below 0.5, more preferably not below 0.6. It is understood that the number of strokes per workpiece revolution should preferably also not be a whole number.

In a further preferred embodiment, the stroke number is at least 30, preferably at least 100, in particular at least 200 double strokes per minute. However, even higher values such as 300 double strokes per minute, even 400 double strokes per minute or more, can be used in order to achieve the highest possible machining speeds.

The advantages of the method according to the invention are particularly pronounced when the toothing width of the shaped toothing is greater than 15 mm, even in the case of toothing widths greater than or equal to 20 mm, in particular 35 mm or more or even 50 mm or more.

In a further preferred embodiment, it is provided that, at least for a first plurality of strokes, a coherent contact track extends over a region of at least 20%, preferably at least 30%, in particular at least 40% of the full profile height of the end geometry of the shaped toothing, as viewed in the profile direction. This further promotes chip formation and the kind of absorption of machining forces on the tool.

The invention moreover provides a control program which, when executed on a controller of a gear shaping machine, controls the machine to carry out a method according to the present invention.

In terms of device technology, the invention provides a gear shaping machine with a controller equipped with a control program. Preference is given to a gear shaping machine equipped with an NC control of the movement axes of the gear shaping machine, the stroke movement of which is effected via a crank drive. However, hydraulic axes can also be used for the stroke. Furthermore, the invention is not limited to special details as regards the implementation of the machine, and it is possible to use gear shaping machines that are familiar to the person skilled in the art and available on the market; the design described in DE 10 2019 004 299 A1 could be used for an exemplary design of a suitable gear shaping machine, wherein the aforementioned document is incorporated by reference herein.

Figure 2:
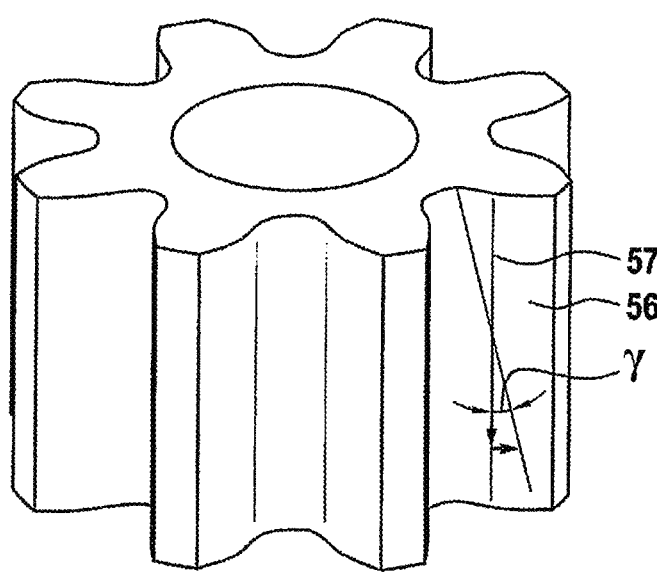
Figure 3:
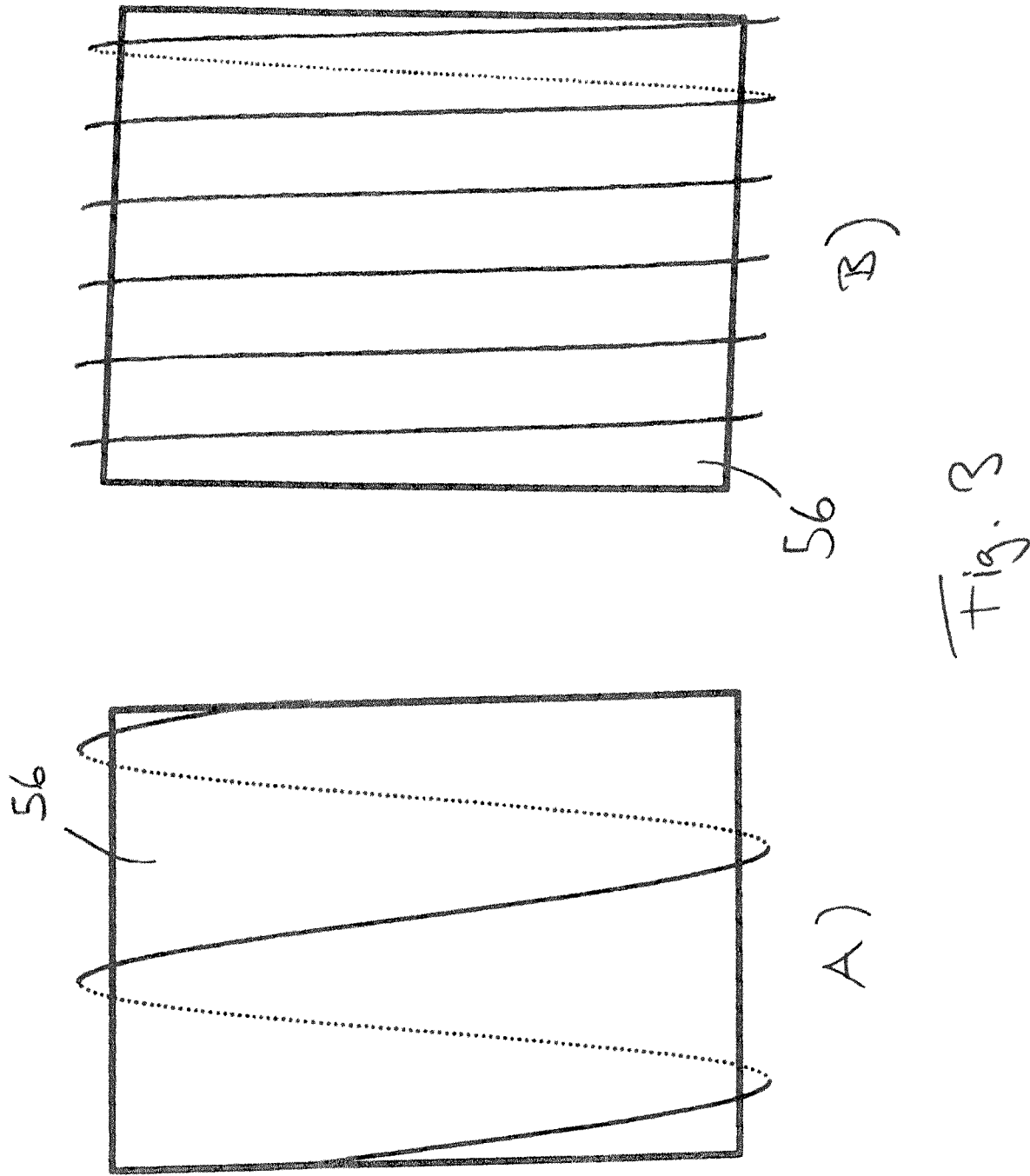

Further features, details and advantages of the invention will be apparent from the following description with reference to the accompanying figures, of which FIG. 1 shows a schematic diagram for the machining engagement during gear shaping, FIG. 2 shows an angle between contact track and flank line on the partial circle in the stroke center, and FIG. 3 shows a qualitative comparison of contact tracks as compared to the prior art.

It can be seen in FIG. 1 how a shaper cutter 40 comes into machining engagement with a workpiece 50 in order to shape a toothing 55 thereon. Shown is the situation during the working stroke at the beginning of the engagement, from which the shaper cutter 40 is moved downwards along the stroke axis Z, while the shaper cutter 40 and the workpiece 50 are in meshing engagement with one another, for which purpose the rotational speeds of the skiving wheel 40 and the workpiece 50 are synchronized in a known manner. In this exemplary embodiment, the stroke movement is carried out with a crank drive as in the prior art; in the given exemplary embodiment, a stroke length of approximately 20 mm is set, with a stroke number of 500 double strokes (working stroke+return stroke) per minute and a rolling speed of 0.95 strokes per division, in order, for example, to shape a straight teething on workpieces. It is understood, however, that the invention is not limited to specific toothing types, such as external toothings or internal toothings; internal toothings are preferably shaped as well. It is also understood that the invention is not limited to specific toothing widths, correlating stroke lengths or pitch sizes; in the present exemplary embodiment, the pitch (normal pitch) of the toothing is, for example, 3 mm and the toothing is a straight toothing. However, the invention can also be applied to helical toothings, but the helical toothing should preferably be less than 14° or the values indicated above.

As regards the design of a suitable gear shaping machine, the designs already known from the prior art can be used, for example the design shown in DE 10 2019 004 299 A1, in which the lifting movement for the return stroke is effected by a rotationally driven cam with a predetermined profile. Said document is incorporated herein by reference in respect of an exemplary design of a toothing machine.

In FIG. 2 (for explanatory or definition purposes; obviously, the form of the gear shown in FIG. 2 differs from that of FIG. 1), the angle $\gamma$ (in the stroke center, which in this exemplary embodiment coincides with the center with respect to the width direction of the toothing 55) is drawn between a contact track of the shaping operation and the flank line 57 on the partial circle on a tooth flank 56. This angle is extremely narrow even in the case of conventional gear shaping with a spiral-degressive feed (as indicated by reference sign 58 in FIG. 1, typical machining tracks run almost parallel to the flank line during conventional gear shaping). In the configuration according to the invention, this angle is considerably larger and its cotangent is considerably smaller, respectively; in the exemplary embodiment in which the second factor $K_2$ is 1 for reasons of simplicity and does not provide any corrections, a value of about 20 being reached for the cotangent $\gamma$.

In FIG. 3, the difference between an exemplary embodiment of the invention (FIG. 3A) and the prior art (FIG. 3B) is juxtaposed once again in a pure relative representation without observing the absolute values (shown in an excessively distorted manner); one can see the machining tracks which extend in a clearly more oblique manner over the tooth flanks 56, which machining tracks—despite no lower stroke numbers—result in both good machining qualities of the shaped toothing 55 and a material removal with lower tool wear.

It is understood that the invention is not limited to the detail features shown in the exemplary embodiments. Rather, the individual features of the above description and of the claims below may be essential, individually and in combination, to the implementation of the invention in its various embodiments.

The invention claimed is:

1. Method for gear shaping a toothing with a specified normal pitch ($m_n$), angle of action ($\alpha$), and a helix angle ($\beta$) on a workpiece, wherein a shaper cutter moving in stroke cycles with a specified stroke length (h) removes material from the workpiece in multiple working strokes with the shaper cutter in a rolling machining engagement with the workpiece, thereby forming contact tracks, wherein each of the contact tracks for at least a first plurality of the working strokes has a respective longitudinal direction that runs at an angle $\gamma$ to a flank line of the toothing, the cotangent of said angle $\gamma$ being smaller than or equal to the product of constants $K_1$ and $K_2$, wherein $K_1$ is in the range of 19.4 to 40, and $K_2$ is a geometry-process factor of $K2 = K_h \cdot K_m \cdot K_\alpha \cdot K_\beta$ with $K_h = h$ [mm]/20, $K_m = 3/m_n$ [mm], $K_\alpha = \sin 20°/\sin \alpha$ and $K_\beta = \cos \beta$.

2. Method according to claim 1, wherein the shaper cutter is fed via the first plurality of strokes, and wherein a feed parameter in the first plurality of strokes is less than 1.4, which feed parameter is defined by the quotient of an amount of radial feeding per workpiece revolution and a lifting amount of the shaper cutter between a working stroke and a return stroke in the first plurality of strokes.

3. Method according to claim 2, wherein the feed parameter is less than 1.3.

4. The method of claim 2 wherein the shaper cutter is fed via the first plurality of strokes in a constant spiral feed.

5. Method according to claim 1 wherein the first plurality of strokes takes place over a feed region with a predominant share of the overall feed for completion of the shaped toothing, and the cotangent γ is greater than $40 \cdot K_2$ over a subsequent further feed region.

6. Method according to claim 1 wherein during a last feeding of the shaper cutter to a final feed depth for machining of the shaped toothing, which last feeding is subsequent to the first plurality of strokes, the cotangent γ is greater than $80 \cdot K_2$.

6

7. Method according to claim 1 wherein the toothing is a straight toothing or the helix angle of the toothing is less than 14°.

8. Method according to claim 1 wherein a width of a tooth of the toothing is at least 60% of a stroke length of each of the working strokes of the first plurality of strokes.

9. Method according to claim 1 wherein a number of the working strokes per workpiece revolution is not a whole number.

10. Method according to claim 1 wherein the shaper cutter is moved in the multiple working strokes, and is also moved in corresponding return strokes, wherein a respective double stroke is constituted by a respective one of the working strokes in combination with a corresponding one of the return strokes, and wherein the shaper cutter is moved at a stroke number rate that is at least 30 double strokes/min.

11. Method according to claim 1 wherein a tooth width of the toothing is greater than 15 mm.

12. Gear shaping machine comprising a controller, the controller being programmed to cause the gear shaping machine to perform the method set forth in claim 1. and the gear shaping machine further comprising the shaper cutter.

* * * * *